(12) United States Patent
Siminoff

(10) Patent No.: US 11,113,938 B2
(45) Date of Patent: Sep. 7, 2021

(54) AUDIO/VIDEO RECORDING AND COMMUNICATION DEVICES WITH MULTIPLE CAMERAS

(71) Applicant: Ring Inc., Santa Monica, CA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/831,854

(22) Filed: Dec. 5, 2017

(65) Prior Publication Data

US 2018/0165933 A1   Jun. 14, 2018

Related U.S. Application Data

(60) Provisional application No. 62/431,863, filed on Dec. 9, 2016.

(51) Int. Cl.
*G08B 13/196* (2006.01)
*G06K 9/00* (2006.01)
(Continued)

(52) U.S. Cl.
CPC ... *G08B 13/19643* (2013.01); *G06K 9/00771* (2013.01); *G06K 9/46* (2013.01);
(Continued)

(58) Field of Classification Search
CPC ..... G06K 2009/00738; G06K 9/00771; G06K 9/46; G08B 13/196; G08B 13/19643;
(Continued)

(56) References Cited

U.S. PATENT DOCUMENTS 4,764,953 A   8/1988   Chern et al.
5,428,388 A   6/1995   von Bauer et al.
(Continued)

FOREIGN PATENT DOCUMENTS

CN   2585521 Y   11/2003
CN   2792061 Y   6/2006
(Continued)

*Primary Examiner* — Anner N Holder
(74) *Attorney, Agent, or Firm* — Lathrop GPM LLP

(57) ABSTRACT

Audio/video (A/V) recording and communication devices with multiple cameras in accordance with various embodiments of the present disclosure are provided. In one embodiment, an A/V recording and communication device is provided, the device comprising a first camera having a first resolution; a second camera having a second resolution, wherein the second resolution is higher than the first resolution; a communication module; and a processing module operatively connected to the first camera, the second camera, and the communication module, the processing module comprising: a processor; and a camera application, wherein the camera application configures the processor to: maintain the first camera in a powered-on state; maintain the second camera in a low-power or powered-off state; and determine when to power up the second camera based on an output signal from the first camera.

20 Claims, 21 Drawing Sheets

(51) Int. Cl.
*G06K 9/46* (2006.01)
*H04N 5/33* (2006.01)
*H04N 5/77* (2006.01)
*H04N 5/225* (2006.01)
*H04N 5/232* (2006.01)
*H04N 5/247* (2006.01)
*H04N 7/18* (2006.01)

(52) U.S. Cl.
CPC . *G08B 13/19667* (2013.01); *G08B 13/19669* (2013.01); *H04N 5/2252* (2013.01); *H04N 5/23206* (2013.01); *H04N 5/232411* (2018.08); *H04N 5/247* (2013.01); *H04N 5/33* (2013.01); *H04N 5/77* (2013.01); *H04N 7/181* (2013.01); *H04N 7/186* (2013.01); *G06K 2009/00738* (2013.01)

(58) Field of Classification Search
CPC .......... H04N 5/232; H04N 5/77; H04N 7/181; H04N 7/186; H04N 7/14
See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,917,355 B1* | 12/2014 | Mo ................. | H04N 21/47205 348/512 |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2004/0212677 A1* | 10/2004 | Uebbing ................ | H04N 5/247 348/155 |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng | |
| 2006/0156361 A1 | 7/2006 | Wang et al. | |
| 2007/0008081 A1 | 1/2007 | Tylicki et al. | |
| 2009/0052805 A1* | 2/2009 | Knee ..................... | H04N 5/247 382/299 |
| 2010/0225455 A1 | 9/2010 | Claiborne et al. | |
| 2010/0296571 A1* | 11/2010 | El-Saban ......... | H04N 21/44012 375/240.01 |
| 2013/0010120 A1* | 1/2013 | Nnoruka ................ | H04N 7/186 348/155 |
| 2013/0057695 A1 | 3/2013 | Huisking | |
| 2013/0235222 A1* | 9/2013 | Karn ................. | H04N 5/23241 348/211.2 |
| 2014/0071245 A1* | 3/2014 | Zhang ................. | H04N 13/239 348/47 |
| 2014/0071330 A1* | 3/2014 | Zhang ................. | H04N 5/23245 348/345 |
| 2014/0267716 A1 | 9/2014 | Child et al. | |
| 2015/0097961 A1* | 4/2015 | Ure ....................... | G08B 5/223 348/159 |
| 2015/0163463 A1 | 6/2015 | Hwang et al. | |
| 2018/0137632 A1* | 5/2018 | Takada .................... | G06T 7/262 |
| 2019/0007589 A1* | 1/2019 | Kadambala ........ | H04N 5/23241 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |

(56) References Cited

FOREIGN PATENT DOCUMENTS

| | | |
|---|---|---|
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

AUDIO/VIDEO RECORDING AND COMMUNICATION DEVICES WITH MULTIPLE CAMERAS

CROSS-REFERENCE TO RELATED APPLICATION

This application claims priority to provisional application Ser. No. 62/431,863, filed on Dec. 9, 2016, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present audio/video (A/V) recording and communication devices with multiple cameras have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V recording and communication devices could be enhanced by adding at least a second camera. For example, two cameras working in tandem could enable functionality that might not be possible with only one camera. For example, in some embodiments the second camera could have different performance characteristics from the first camera, such as different resolution and/or different power consumption. The low-power, low-res camera may be powered on at all times, while the high-power, high-res camera is typically powered off. The low-power, low-res camera can then be used in a process for determining when to power on the high-power, high-res camera. This arrangement can have particular benefit in a battery-powered A/V recording and communication device, where conserving battery power is desirable to prolong the usable life of the device between battery recharges. In some embodiments, video footage recorded by the low-power, low-res camera can be added to the stream from the high-power, high-res camera to create a pre-roll. Also in some embodiments, the two cameras may be arranged so that their fields of view are coincident (or at least overlapping). The low-power, low-res camera may record video footage before the high-power, high-res camera is powered up, and after the high-power, high-res camera powers up the video footage recorded by the high-power, high-res camera can be used instead of the video footage recorded by the low-power, low-res camera (e.g., the high-power, high-res camera, upon power up, takes over for the low-power, low-res camera). Further, in some embodiments, the low-power, low-res camera may perform at least one other function in addition to recording video footage, such as determining the speed of a passing vehicle. If the speed of the passing vehicle is above a threshold speed, the high-power, high-res camera can be powered up to capture high-resolution images of the vehicle, such as of the vehicle's license plate. These and other aspects and advantages of the present embodiments are described in further detail below.

In a first aspect, an audio/video (A/V) recording and communication device is provided, the device comprising a first camera having a first resolution; a second camera having a second resolution, wherein the second resolution is higher than the first resolution; a communication module; and a processing module operatively connected to the first camera, the second camera, and the communication module, the processing module comprising: a processor; and a camera application, wherein the camera application configures the processor to: maintain the first camera in a powered-on state; maintain the second camera in a low-power or powered-off state; and determine when to power up the second camera based on an output signal from the first camera.

An embodiment of the first aspect further comprises a memory.

In another embodiment of the first aspect, the camera application further configures the processor to record, using the first camera, video image data of a field of view of the first camera and to store the video image data in the memory.

In another embodiment of the first aspect, the memory comprises a rolling buffer.

In another embodiment of the first aspect, the camera application further configures the processor to power up the second camera when the output signal from the first camera indicates that motion has been detected in a field of view of the first camera.

In another embodiment of the first aspect, the camera application further configures the processor to combine video image data recorded using the first camera with video image data recorded using the second camera.

In another embodiment of the first aspect, the camera application further configures the processor to stream the combined video image data to a client device.

In another embodiment of the first aspect, the camera application further configures the processor to transmit the combined video image data to a backend server.

In another embodiment of the first aspect, the camera application further configures the processor to obtain speed data, using the first camera, of an object that caused motion to be detected in a field of view of the first camera.

In another embodiment of the first aspect, the camera application further configures the processor to determine whether the obtained speed data indicates a speed of the object greater than a threshold speed.

In another embodiment of the first aspect, the camera application further configures the processor to power up the second camera when it is determined that the obtained speed data indicates a speed of the object greater than the threshold speed.

In another embodiment of the first aspect, the camera application further configures the processor to obtain image data of the object using the second camera.

In another embodiment of the first aspect, the camera application further configures the processor to transmit the obtained speed data and the obtained image data to a backend server.

In another embodiment of the first aspect, the camera application further configures the processor to power up the second camera when the output signal from the first camera indicates that a person has been detected in a field of view of the first camera.

In another embodiment of the first aspect, a field of view of the first camera is substantially coincident with a field of view of the second camera.

In another embodiment of the first aspect, the camera application further configures the processor to enhance first video image data recorded using the first camera using second video image data recorded using the second camera.

In another embodiment of the first aspect, the camera application further configures the processor to enhance the video image data recorded using the first camera with the video image data recorded using the second camera.

In another embodiment of the first aspect, the video image data recorded using the first camera and the second data are combined by prepending the video image data recording using the first camera to the video image data recorded using the second camera.

In another embodiment of the first aspect, the camera application further configures the processor to differentiate motion caused by a person from motion caused by other objects by comparing a set of motion characteristics of a moving object with a dataset.

In another embodiment of the first aspect, the A/V recording and communication device comprises a doorbell having a front button.

In a second aspect, an audio/video (A/V) recording and communication device is provided, the device comprising a first camera having a first resolution; a second camera having a second resolution, wherein the second resolution is higher than the first resolution; a communication module; and a processing module operatively connected to the first camera, the second camera, and the communication module, the processing module comprising: a processor; and a camera application.

An embodiment of the second aspect further comprises a memory.

In another embodiment of the second aspect, the camera application configures the processor to record, using the first camera, video image data of a field of view of the first camera and to store the video image data in the memory.

In another embodiment of the second aspect, the memory comprises a rolling buffer.

In another embodiment of the second aspect, the camera application configures the processor to power up the second camera when an output signal from the first camera indicates that motion has been detected in a field of view of the first camera.

In another embodiment of the second aspect, the camera application further configures the processor to combine video image data recorded using the first camera with video image data recorded using the second camera.

In another embodiment of the second aspect, the camera application further configures the processor to stream the combined video image data to a client device.

In another embodiment of the second aspect, the camera application further configures the processor to transmit the combined video image data to a backend server.

In another embodiment of the second aspect, the camera application configures the processor to obtain speed data, using the first camera, of an object that caused motion to be detected in a field of view of the first camera.

In another embodiment of the second aspect, the camera application further configures the processor to determine whether the obtained speed data indicates a speed of the object greater than a threshold speed.

In another embodiment of the second aspect, the camera application further configures the processor to power up the second camera when it is determined that the obtained speed data indicates a speed of the object greater than the threshold speed.

In another embodiment of the second aspect, the camera application further configures the processor to obtain image data of the object using the second camera.

In another embodiment of the second aspect, the camera application further configures the processor to transmit the obtained speed data and the obtained image data to a backend server.

In another embodiment of the second aspect, the camera application configures the processor to power up the second camera when the output signal from the first camera indicates that a person has been detected in a field of view of the first camera.

In another embodiment of the second aspect, a field of view of the first camera is substantially coincident with a field of view of the second camera.

In another embodiment of the second aspect, the camera application configures the processor to enhance first video image data recorded using the first camera using second video image data recorded using the second camera.

In another embodiment of the second aspect, the A/V recording and communication device comprises a doorbell having a front button.

BRIEF DESCRIPTION OF THE DRAWINGS

The various embodiments of the present audio/video (A/V) recording and communication devices with multiple cameras now will be discussed in detail with an emphasis on highlighting the advantageous features. These embodiments depict the novel and non-obvious A/V recording and communication devices with multiple cameras shown in the accompanying drawings, which are for illustrative purposes only. These drawings include the following figures, in which like numerals indicate like parts.

DETAILED DESCRIPTION

Figure 1:
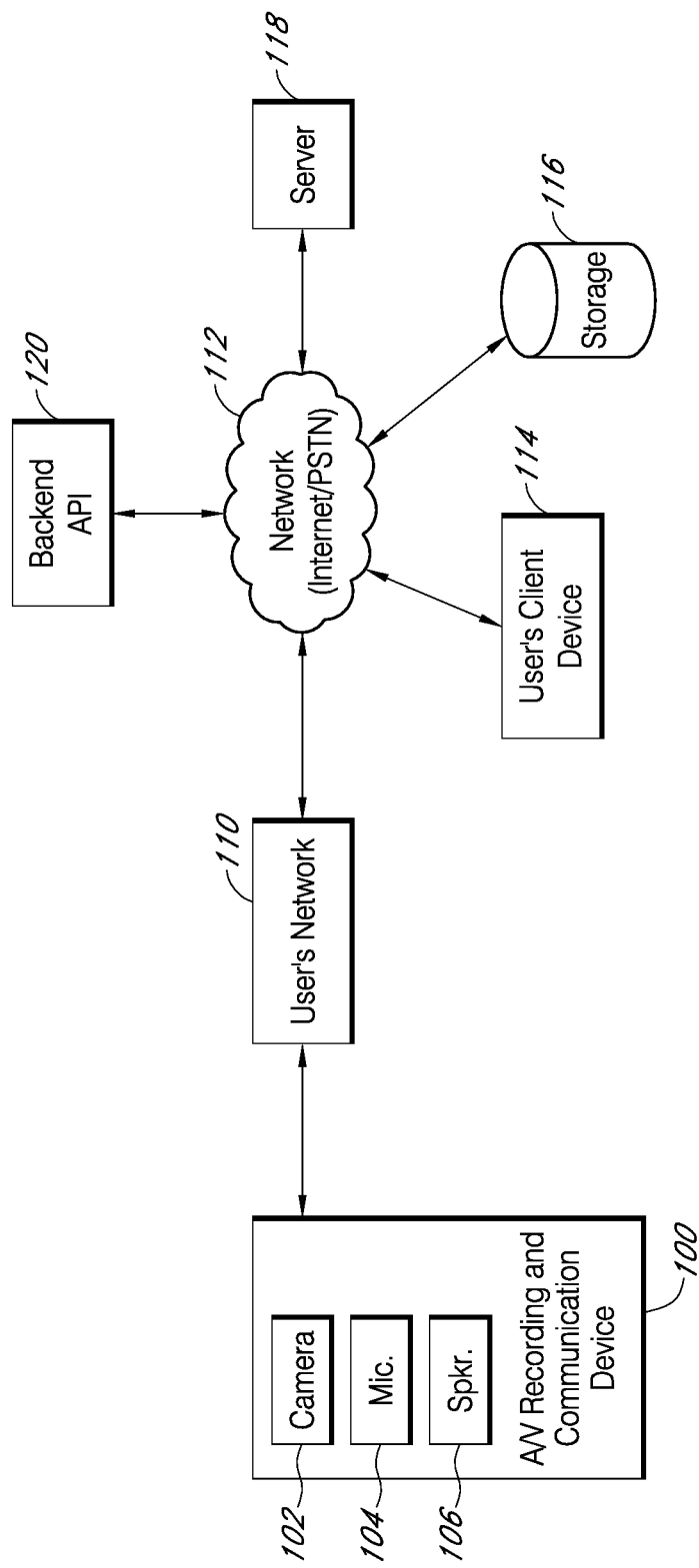
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present audio/video (A/V) recording and communication devices with multiple cameras are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
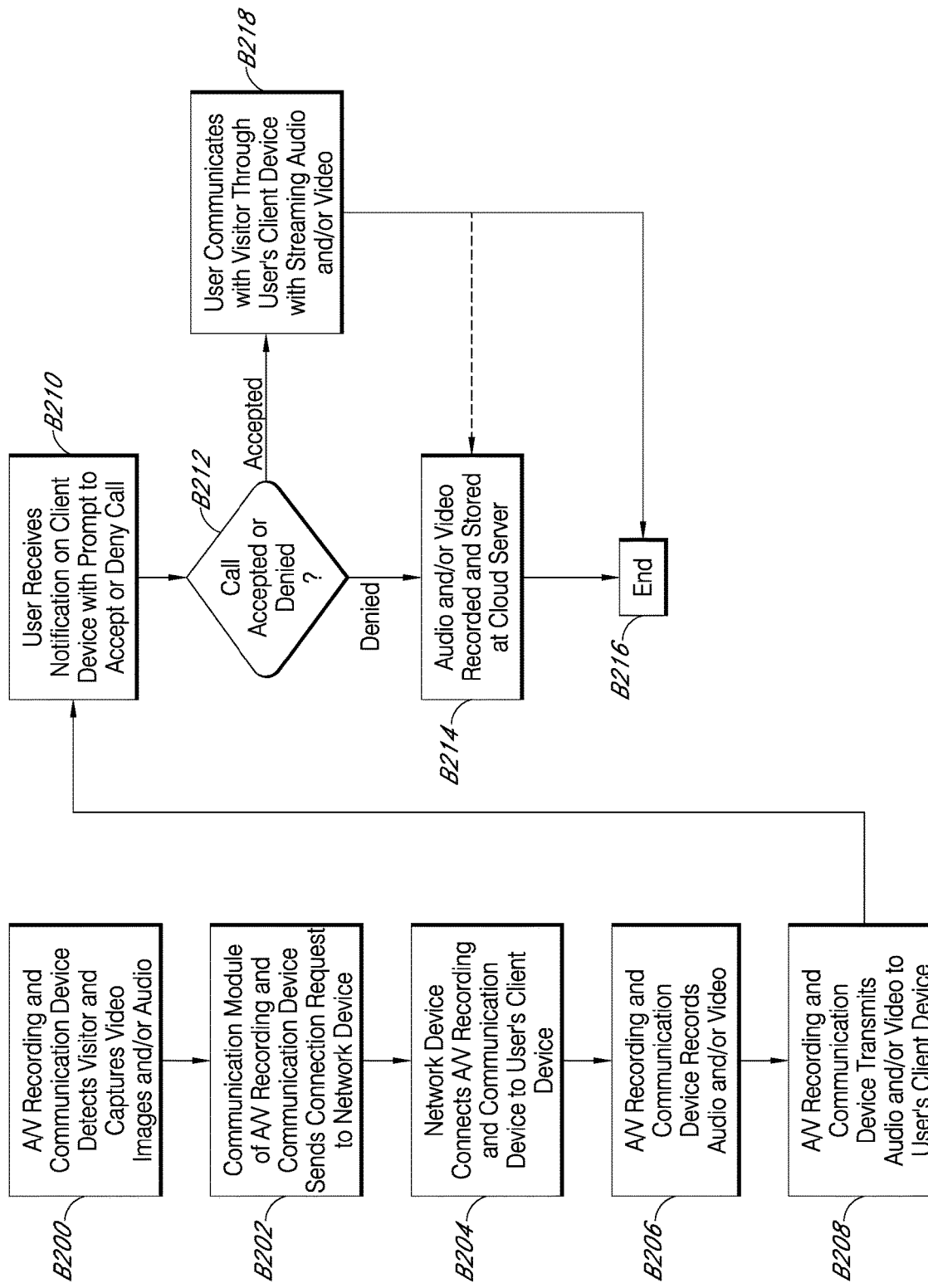
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
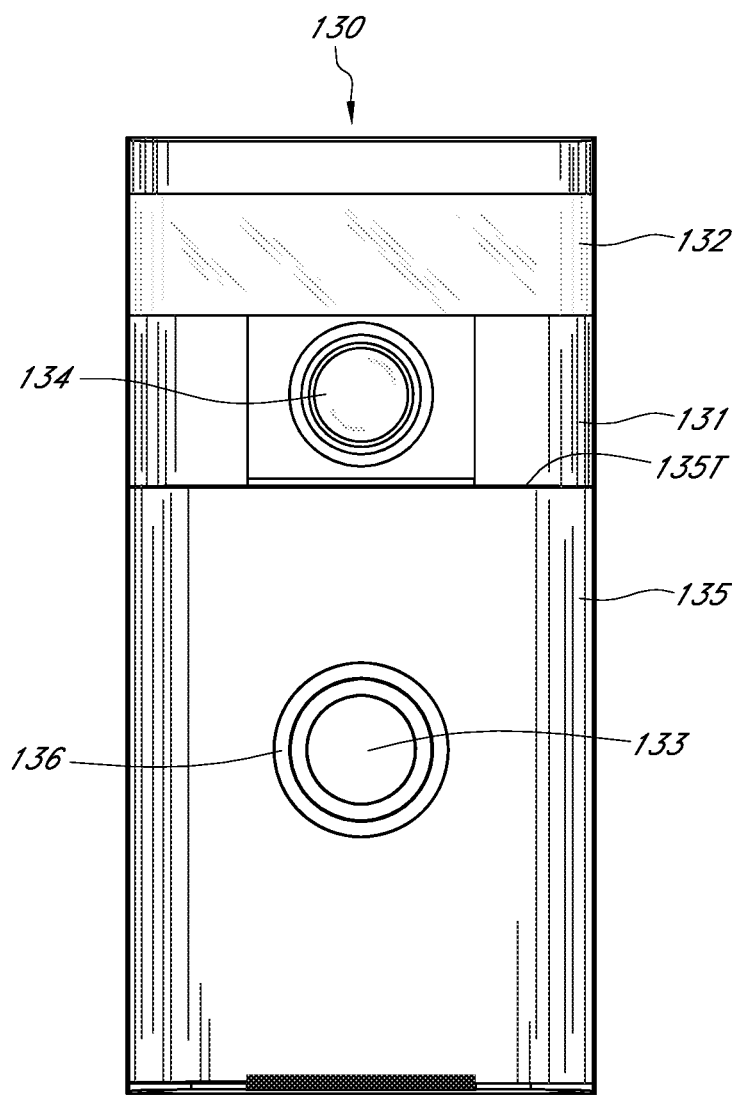
FIG. 3 is a front view of an A/V recording and communication device according to various aspects of the present disclosure.
Figure 4:
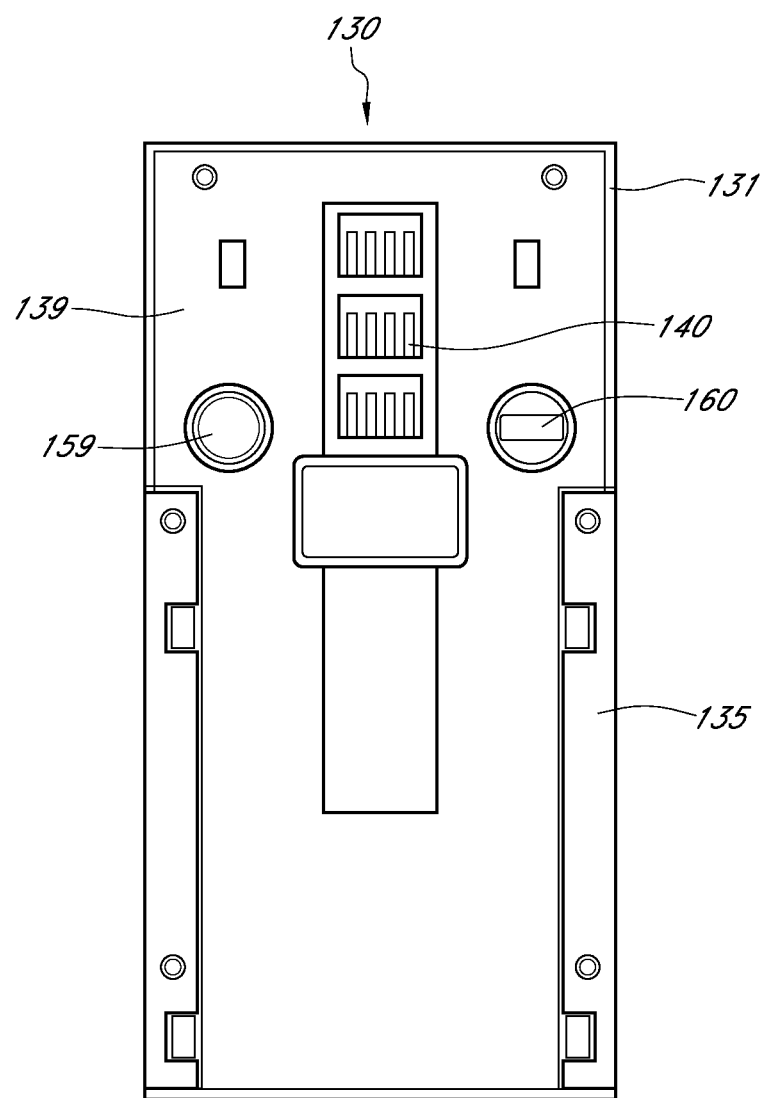
FIG. 4 is a rear view of the A/V recording and communication device of FIG. 3.
Figure 5:
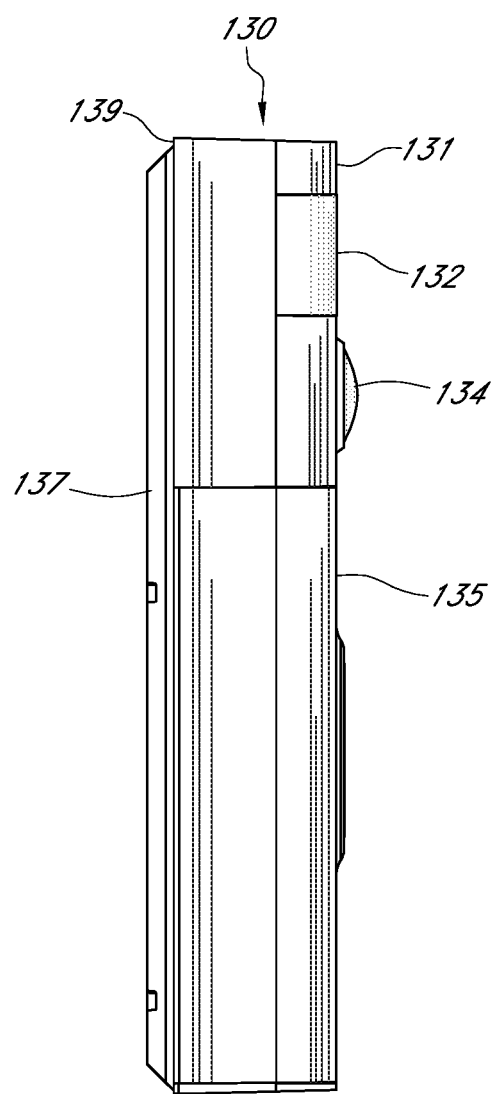
FIG. 5 is a left side view of the A/V recording and communication device of FIG. 3 attached to a mounting bracket according to various aspects of the present disclosure.

FIGS. 3-5 illustrate a wireless audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
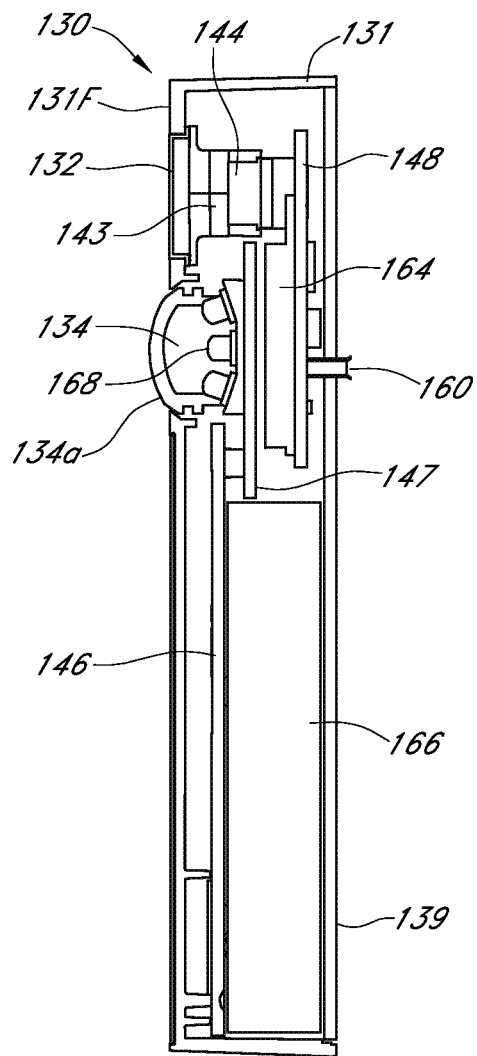
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
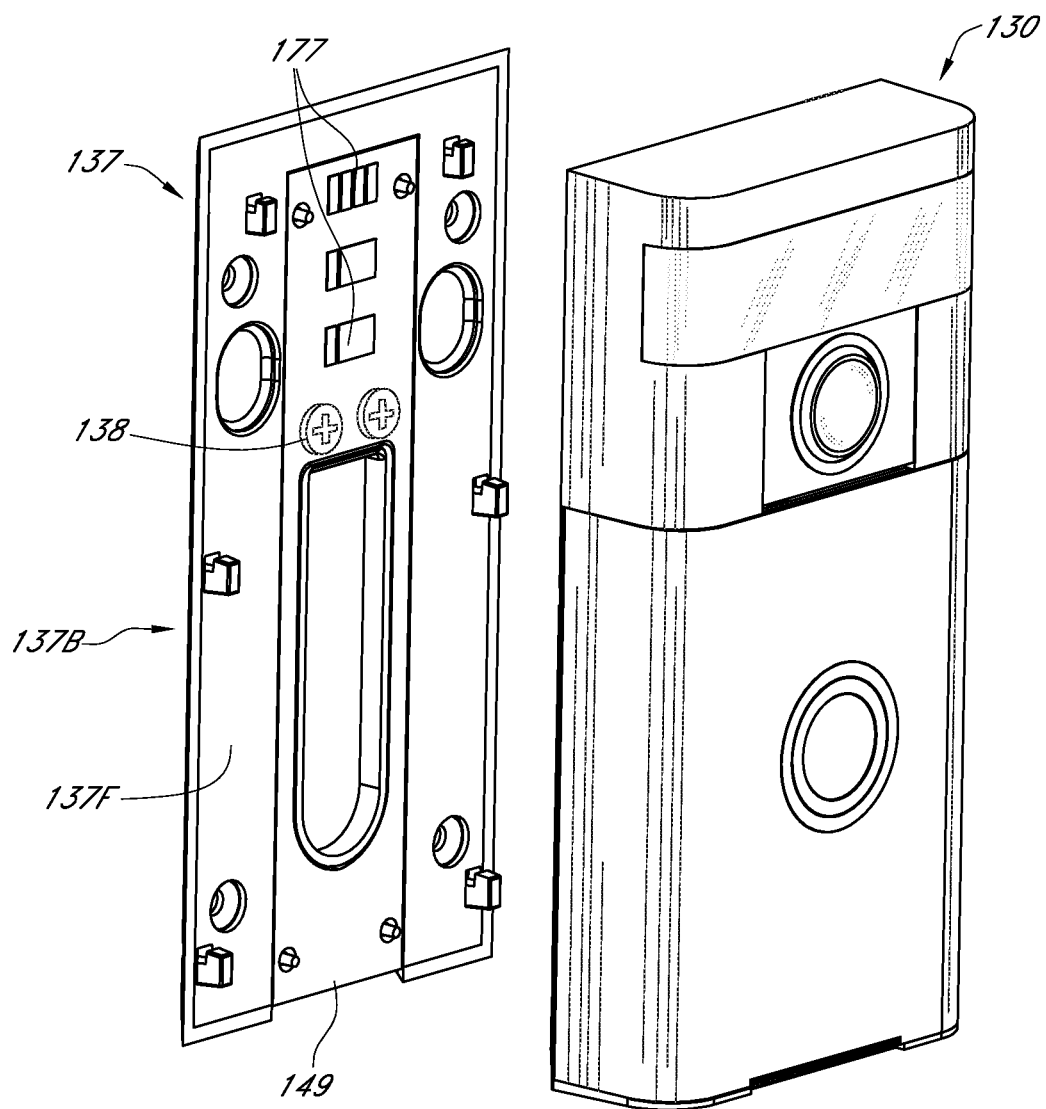
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
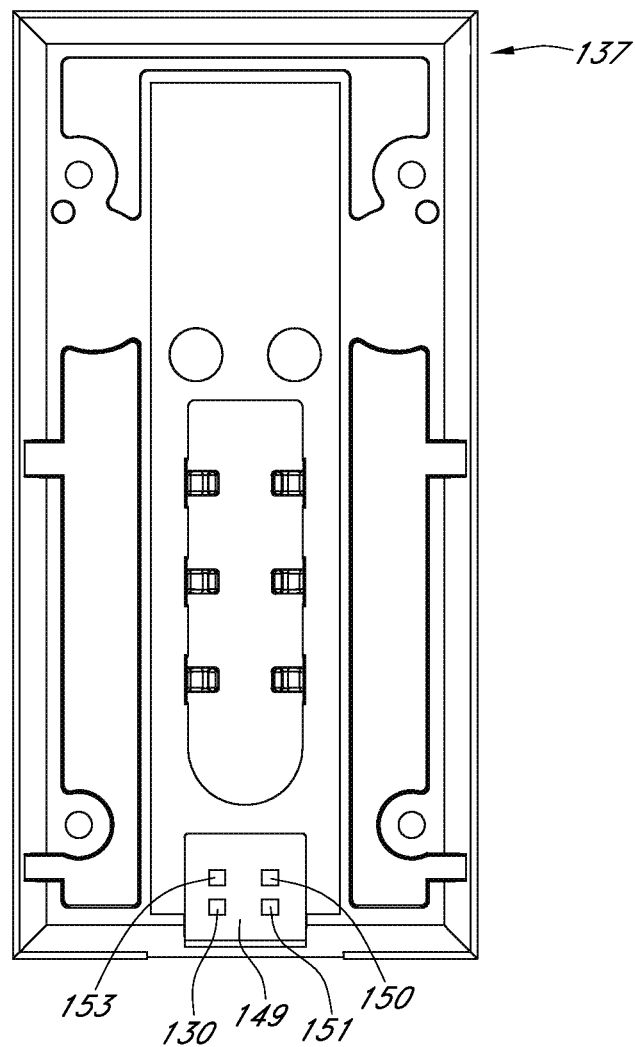
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
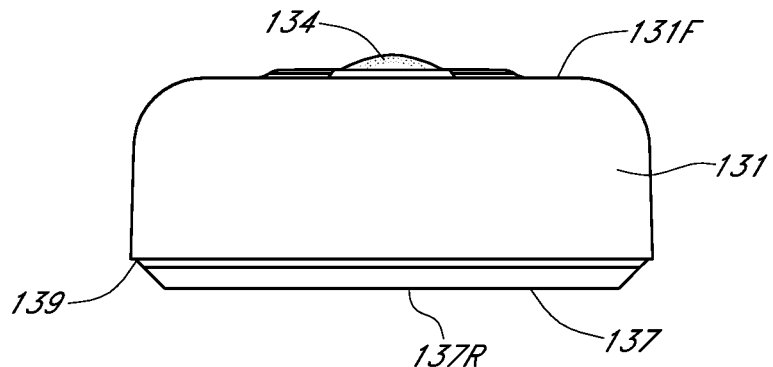
FIGS. 9 and 10 are top and bottom views, respectively, of the A/V recording and communication device and the mounting bracket of FIG. 5.
Figure 10:
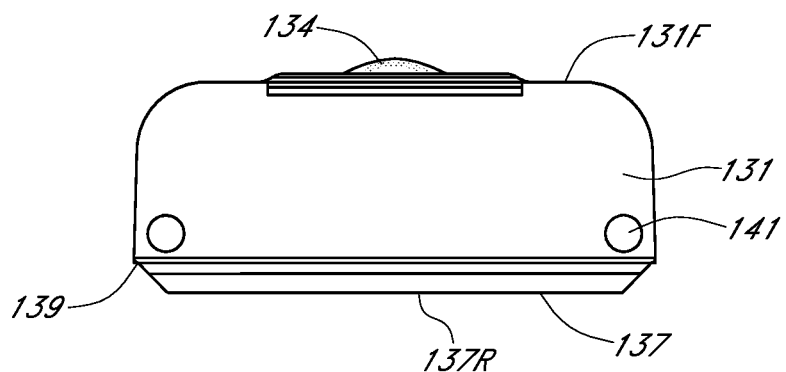

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
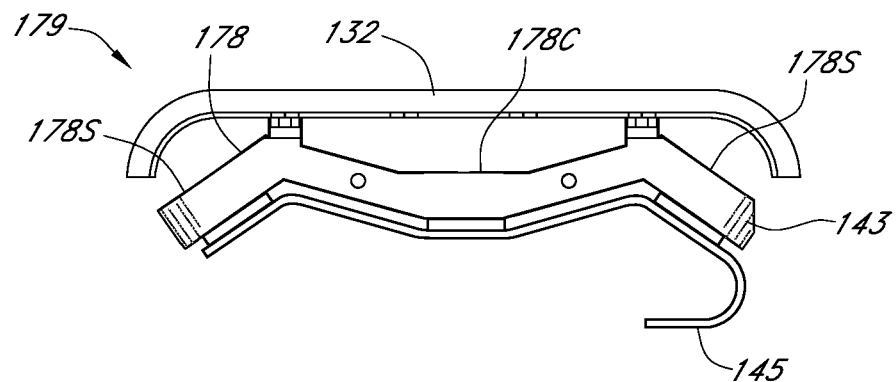
FIG. 11 is a top view of a passive infrared sensor assembly according to various aspects of the present disclosure.
Figure 12:
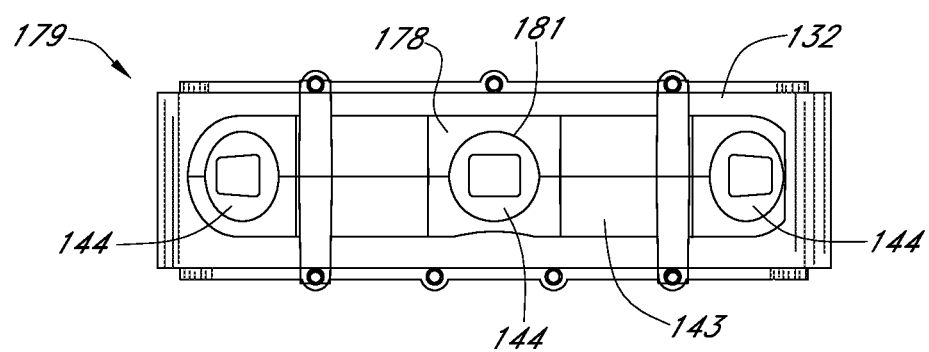
FIG. 12 is a front view of the passive infrared sensor assembly of FIG. 11.

FIG. 11 is a top view and FIG. 12 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 12, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 11, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 13:
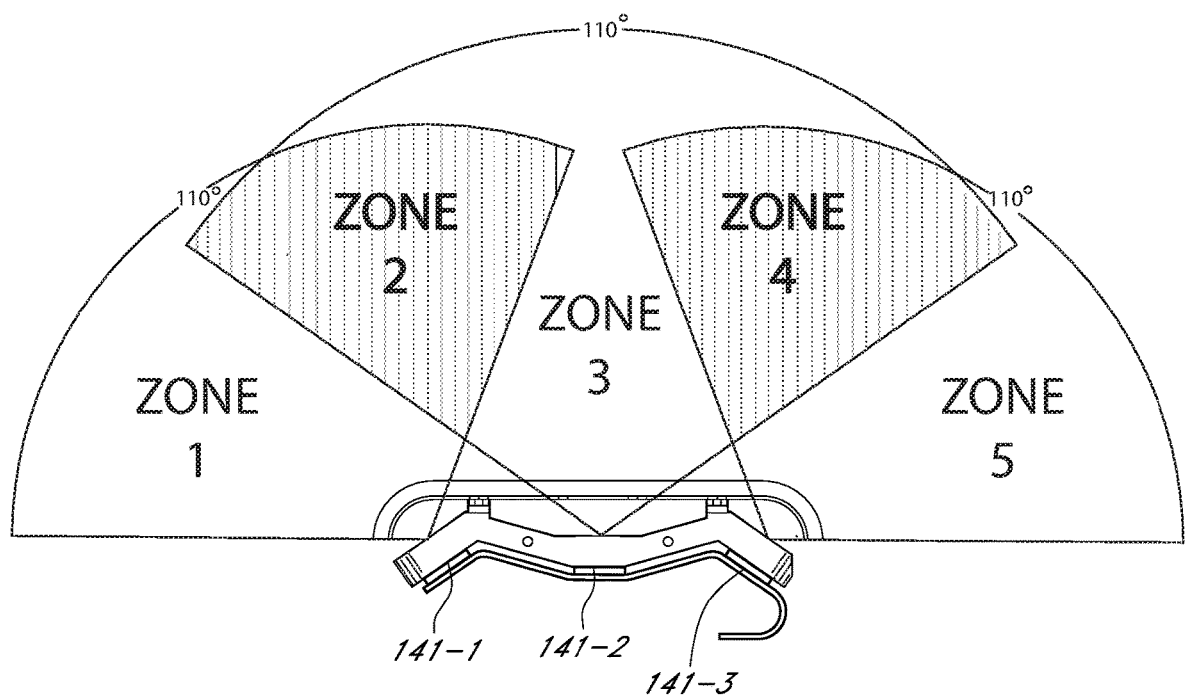
FIG. 13 is a top view of the passive infrared sensor assembly of FIG. 11, illustrating the fields of view of the passive infrared sensors according to various aspects of the present disclosure.

FIG. 13 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 14:
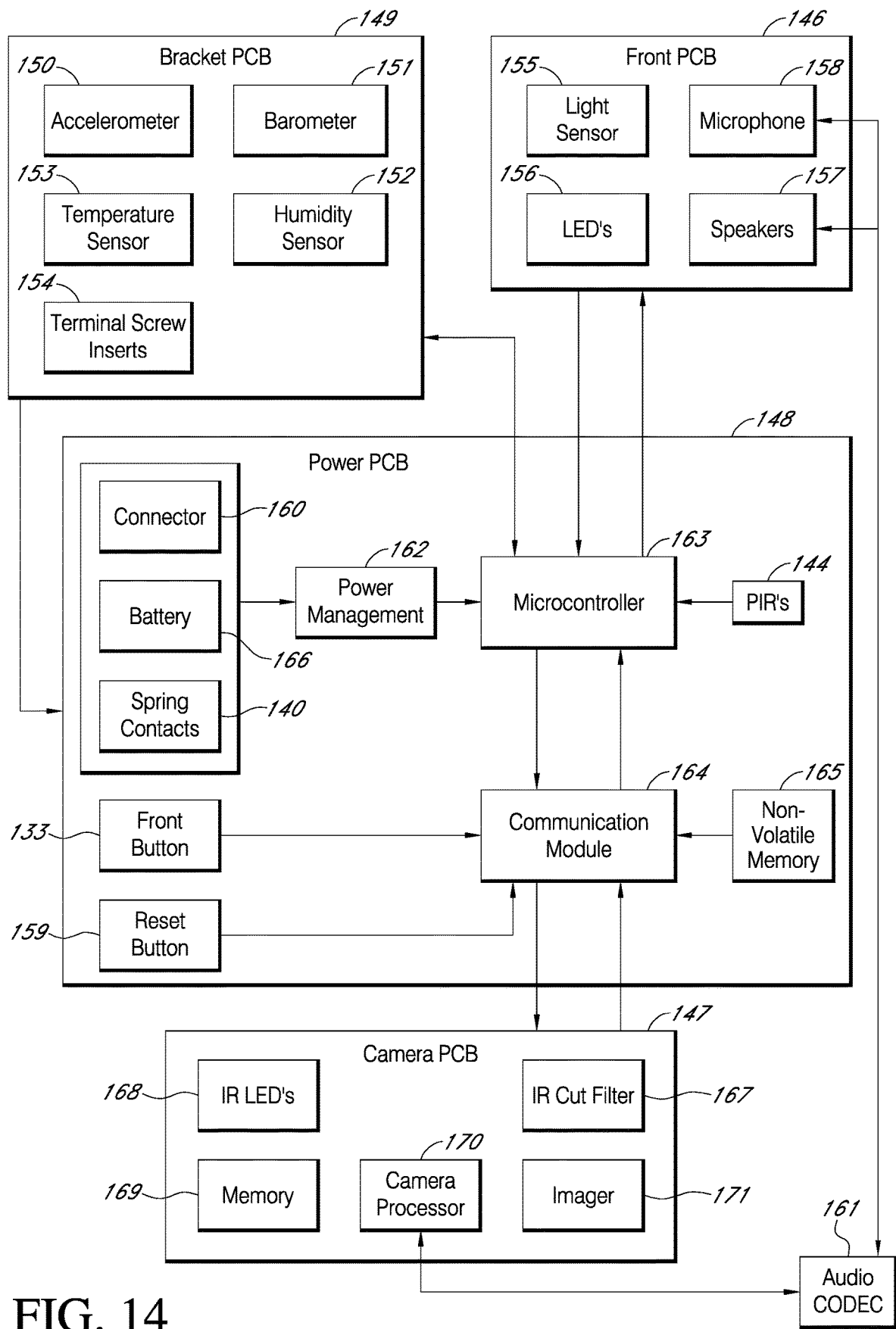
FIG. 14 a functional block diagram of the components of the A/V recording and communication device of FIG. 3.

FIG. 14 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 14, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 14, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 14, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 14, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 14, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 14, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments leverage the capabilities of audio/video (A/V) recording and communication devices, thereby providing enhanced functionality to such devices to reduce crime and increase public safety. One aspect of the present embodiments includes the realization that A/V recording and communication devices could be enhanced by adding at least a second camera. For example, two cameras working in tandem could enable functionality that might not be possible with only one camera. For example, in some embodiments the second camera could have different performance characteristics from the first camera, such as different resolution and/or different power consumption. The low-power, low-res camera may be powered on at all times, while the high-power, high-res camera is typically powered off. The low-power, low-res camera can then be used in a process for determining when to power on the high-power, high-res camera. This arrangement can have particular benefit in a battery-powered A/V recording and communication device, where conserving battery power is desirable to prolong the usable life of the device between battery recharges. In some embodiments, video footage recorded by the low-power, low-res camera can be added to the stream from the high-power, high-res camera to create a pre-roll. Also in some embodiments, the two cameras may be arranged so that their fields of view are coincident (or at least overlapping). The low-power, low-res camera may record video footage before the high-power, high-res camera is powered up, and after the high-power, high-res camera powers up the video footage recorded by the high-power, high-res camera can be used instead of the video footage recorded by the low-power, low-res camera (e.g., the high-power, high-res camera, upon power up, takes over for the low-power, low-res camera). Further, in some embodiments, the low-power, low-res camera may perform at least one other function in addition to recording video footage, such as determining the speed of a passing vehicle. If the speed of the passing vehicle is above a threshold speed, the high-power, high-res camera can be powered up to capture high-resolution images of the vehicle, such as of the vehicle's license plate. These and other aspects and advantages of the present embodiments are described in further detail below.

Figure 15:
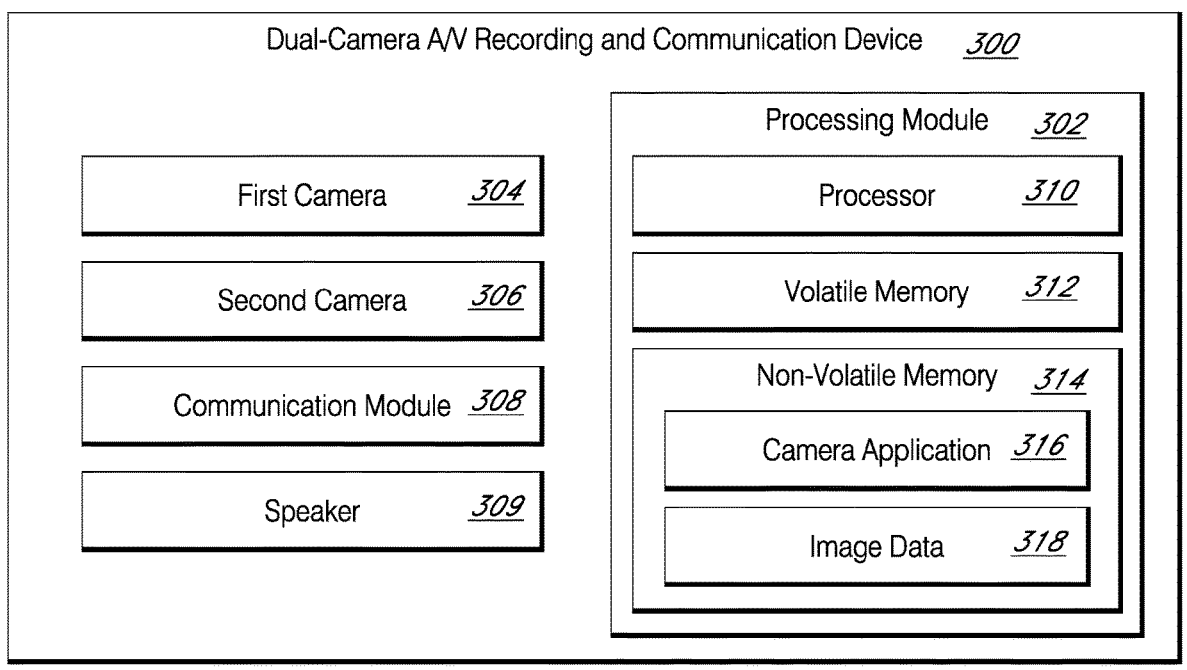
FIG. 15 is a functional block diagram illustrating one embodiment of a dual-camera A/V recording and communication device according to various aspects of the present disclosure.

FIG. 15 is a functional block diagram of an embodiment of a dual-camera A/V recording and communication device 300 according to various aspects of the present disclosure. In some embodiments, the dual-camera A/V recording and communication device 300 may be used with the system illustrated in FIG. 1. For example, the dual-camera A/V recording and communication device 300 may take the place of the A/V recording and communication device 100, or may be used in conjunction with the A/V recording and communication device 100.

With reference to FIG. 15, the dual-camera A/V recording and communication device 300 may include a processing module 302 that is operatively connected to a first camera 304, a second camera 306, a communication module 308, and a speaker 309. The processing module 302 may comprise a processor 310, a volatile memory 312, and a non-volatile memory 314 that includes a camera application 316. The camera application 316 may configure the processor 310 to perform one or more processes for capturing image data (and/or other types of processes), as further described below. The non-volatile memory 314 may also include image data 318 captured by either or both of the first and second cameras 304, 306. Further, in some embodiments, the communication module 308 may comprise (but is not limited to) one or more transceivers and/or wireless antennas (not shown) configured to transmit and receive wireless signals. In further embodiments, the communication module 308 may comprise (but is not limited to) one or more transceivers configured to transmit and receive wired and/or wireless signals.

In the illustrated embodiment of FIG. 15, the various components including (but not limited to) the processing module 302 and the communication module 308 are represented by separate boxes. The graphical representation depicted in FIG. 15 is, however, merely one example, and is not intended to indicate that any of the various components of the dual-camera A/V recording and communication device 300 are necessarily physically separate from one another, although in some embodiments they might be. In other embodiments, however, the structure and/or functionality of any or all of these components may be combined. For example, in some embodiments the communication module 308 may include its own processor, volatile memory, and/or non-volatile memory.

In the illustrated embodiment, the A/V recording and communication device 300 includes two cameras 304, 306. The present embodiments are not limited, however, to devices having two cameras. Rather, the present embodiments include alternative devices having any number of cameras, such as more than two (e.g., three cameras, four cameras, five cameras, etc.).

In some embodiments, the dual-camera A/V recording and communication device 300 may be similar in structure and/or function to the A/V recording and communication device 130 (FIGS. 3-14) with the added feature of a second camera. For example, the dual-camera A/V recording and communication device 300 may include a first camera similar (or identical) in structure and/or function to the camera 134 of the A/V recording and communication device 130, and a second camera. In certain embodiments, the second camera may also be similar (or identical) in structure and/or function to the camera 134 of the A/V recording and communication device 130.

However, in further embodiments the first and second cameras 304, 306 may differ from one another in one or more ways. For example, in some embodiments the first camera 304 may have a first resolution and the second camera 306 may have a second resolution, wherein the first and second resolutions are different. In some embodiments, the second resolution may be higher than the first resolution, or vice versa. The different resolutions of the first and second cameras 304, 306 may result in the lower resolution camera also consuming less power than the higher resolution camera. In alternative embodiments, one of the cameras 304, 306 may consume less power than the other camera 304, 306, even if the difference in power consumption is unrelated to the resolution(s) of the two cameras 304, 306. For example, in some embodiments the two cameras 304, 306 may have similar (or the same) resolution, but one of the cameras 304, 306 may consume less power than the other camera 304, 306.

In some embodiments, the first camera 304, which may have a lower resolution and/or consume less power than the second camera 306, may remain in a persistent powered up state (e.g., the first camera 304 may be powered on and recording image data at all times). The second camera 306, however, which may have a higher resolution and/or consume more power than the first camera 304, may remain in a powered down state most of the time (may also be referred to as a hibernation state, or a low-power state, or the like). This configuration, in which the first camera 304 is always powered on and the second camera 306 is usually powered down, advantageously conserves power, which is of particular advantage in embodiments in which the A/V recording and communication device 300 is powered by a rechargeable battery (e.g., is not connected to a source of external power, such as AC mains). The second camera 306 may be powered up to capture image data only at certain times, as described below, and may revert to the low-power state after a condition (e.g., motion in the field of view) that caused the second camera 306 to power up is no longer extant. In some embodiments, when the second camera 306 is powered up the first camera 304 may power down in order to conserve the battery. The first camera 304 may then power up again when the second camera 306 again powers down.

Figure 16:
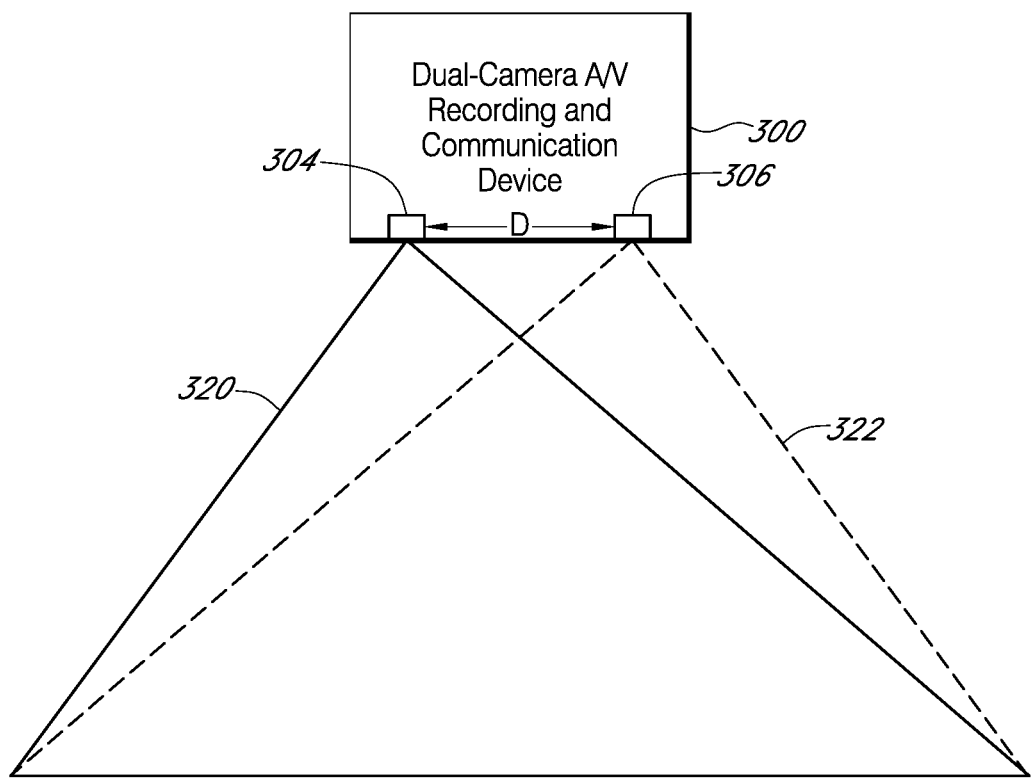
FIG. 16 is a schematic diagram illustrating a dual-camera A/V recording and communication device having substantially coincident fields of view according to various aspects of the present disclosure.

With reference to FIG. 16, the first camera 304 may comprise a first field of view 320 and the second camera 306 may comprise a second field of view 322. The first and second fields of view 320, 322 may be substantially coincident, or may at least have substantial overlap. The overlapping (or substantially coincident) fields of view 320, 322 may in some embodiments enable the first and second cameras 304, 306 to work in tandem to achieve various advantages, as described below. In some embodiments, the first and second cameras 304, 306 may be spaced from one another by a distance D, which may result in the fields of view 320, 322 being not completely coincident, and which may create one or more advantages, as described herein.

In some embodiments, the image data 318 recorded by the first camera 304, which may be always recording, may be written to a rolling buffer or a sliding window, which may be part of the volatile memory 312 and/or the non-volatile memory 314. A rolling buffer, which may also be referred to as a circular buffer, a circular queue, a cyclic buffer, or a ring buffer, is a data structure that uses a single, fixed-size buffer as if it were connected end-to-end. In some embodiments, about 10-15 seconds (or more, such as 20 seconds, 25 seconds, 30 seconds, etc.) of recorded footage can be continuously stored in the rolling buffer or sliding window.

The image data 318 recorded by the first camera 304 may be used to determine whether motion is present in the first field of view 320, such as by comparing pixel changes in successive video frames. The comparison may in some embodiments be performed by the processor 310, for example. If motion is detected in the first field of view 320, then the second camera 306 may be powered up and used to capture image data 318 from the second field of view 322. In this manner, the first camera 304, which may consume less power than the second camera 306, may remain powered up so that it can be used for motion detection, and when motion is detected then the second camera 306, which may have higher resolution than the first camera 304, may capture high-resolution image data 318 from the second field of view 322. The image data 318 may be stored locally, such as in the volatile memory 312 and/or the non-volatile memory 314 of the A/V recording and communication device 300, may be transmitted to a backend server (e.g., the server 118) for storage, and/or may be streamed to a client device (e.g., the client device 114) with an alert. In some embodiments, when the second camera 306 is powered up the first camera 304 may power down in order to conserve the battery. The first camera 304 may then power up again when the second camera 306 again powers down.

Figure 17:
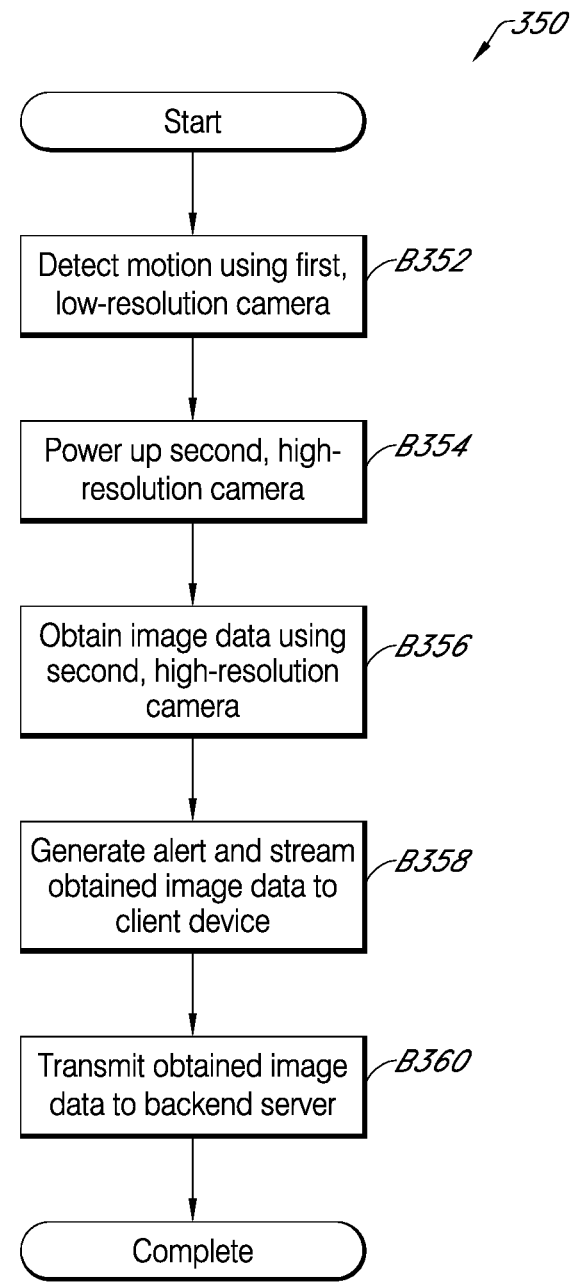
FIG. 17 is a flowchart illustrating an embodiment of a process for a dual-camera A/V recording and communication device according to various aspects of the present disclosure.

FIG. 17 is a flowchart illustrating an embodiment of a process 350 for a dual-camera A/V recording and communication device according to various aspects of the present disclosure. At block B352, the first, lower-resolution camera 304 may detect motion in the first field of view 320. In alternative embodiments, the motion in the first field of view 320 may be detected by the processor 310, such as by comparing successive video frames recorded by the first camera 304 and/or based on an output signal of the first camera 304.

With continued reference to FIG. 17, at block B354 the second, higher-resolution camera 306 may be powered up in response to the motion detected at block B352. At this time, the first camera 304 may power down to conserve battery. The second, higher-resolution camera 306 may then obtain image data 318, as shown at block B356. If motion alerts are set to active, an alert may be generated and transmitted to the user's client device 114 along with streaming video at block B358. The streaming video may include the image data 318 obtained by the second, higher-resolution camera 306. At block B360, the image data 318 obtained by the second, higher-resolution camera 306 may be transmitted to a backend server, such as the server 118. While not shown in FIG. 17, when the motion is no longer present in the field of view 320, 322 of either camera 304, 306, the second camera 306 may again power down and the first camera 304 may power up again (if it powered down when the second camera 306 powered up).

Figure 18:
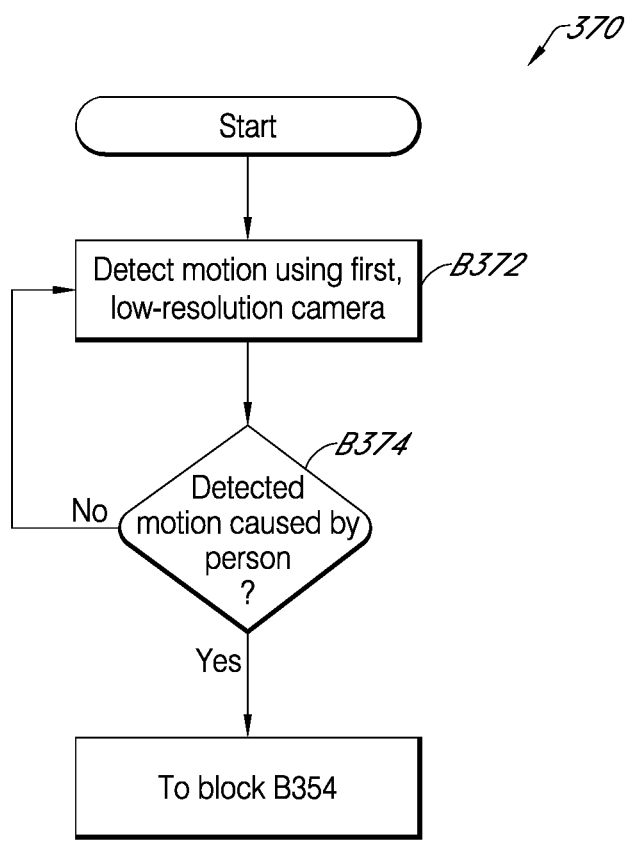
FIG. 18 is a flowchart illustrating another embodiment of a process for a dual-camera A/V recording and communication device according to various aspects of the present disclosure.

In some embodiments, the second, higher-resolution camera 306 may not be powered up unless and until it is determined that the motion detected by the first camera 304 was caused by a person (a human), rather than by an animal, or a passing vehicle, or some other likely benign cause. For example, FIG. 18 is a flowchart illustrating another embodiment of a process 370 for a dual-camera A/V recording and communication device according to various aspects of the present disclosure. At block B372, the first, lower-resolution camera 304 may detect motion in the first field of view 320. In alternative embodiments, the motion in the first field of view 320 may be detected by the processor 310, such as by comparing successive video frames recorded by the first camera 304 and/or based on an output signal of the first camera 304. At block B374, it may be determined whether the detected motion was caused by a person. If not, the process may loop back to block B372. However, if the detected motion was caused by a person then the process may advance to block B354 of FIG. 17, and successive blocks, which are described above with respect to FIG. 17. Various techniques may be used to differentiate motion caused by a human (or humans) from motion caused by other objects. For example, in some of the present embodiments, a process for determining whether a moving object is a human compares characteristics of the motion of the moving object with a dataset. For example, in each frame, the A/V recording and communication device 300 may detect object regions, extract features from those object regions, and then compare those features with trained features in the dataset. If a comparison score and a confidence level are above pre-defined thresholds, then the algorithm returns a positive output (e.g. human) on the detected object region.

Figure 19:
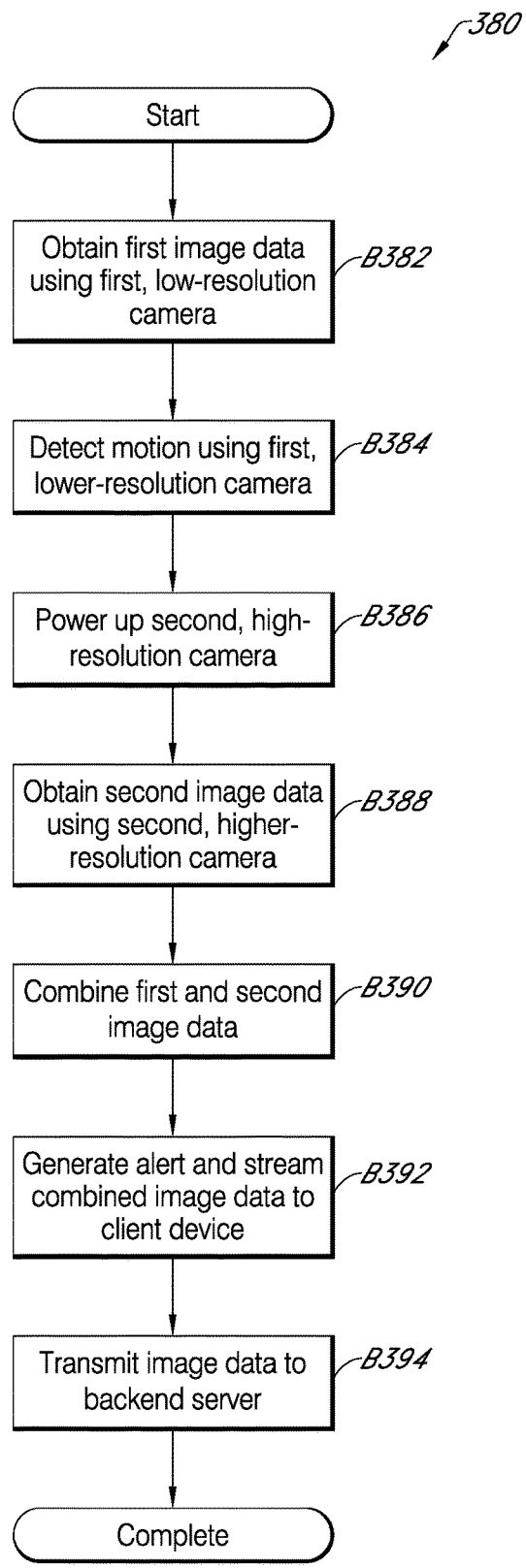
FIG. 19 is a flowchart illustrating another embodiment of a process for a dual-camera A/V recording and communication device according to various aspects of the present disclosure.

FIG. 19 is a flowchart illustrating another embodiment of a process 380 for a dual-camera A/V recording and communication device according to various aspects of the present disclosure. At block B382, the first, lower-resolution camera 304 may obtain image data 318 of the first field of view 320 (may also be referred to as first image data). As described above, the first, lower-resolution camera 304 may be perpetually recording, and the image data 318 captured by the first camera 304 may be stored in a rolling buffer. Then, at block B384, the first camera 304 may detect motion in the first field of view 320. In alternative embodiments, the motion in the first field of view 320 may be detected by the processor 310, such as by comparing successive video frames recorded by the first camera 304 and/or based on an output signal of the first camera 304.

With continued reference to FIG. 19, at block B386 the second, higher-resolution camera 306 may be powered up in response to the motion detected at block B384. The second, higher-resolution camera 306 may then obtain image data 318 (may also be referred to as second image data), as shown at block B388. Then, at block B390, the video image data 318 recorded using the first camera 304 may be combined with the video image data 318 recorded using the second camera 306. In some embodiments, the processor 310 may perform the combining, and the first image data 318 recorded using the first camera 304, which was recorded earlier in time than the second image data 318 recorded using the second camera 306, may be prepended to the second image data 318 recorded using the second camera 306 so that the combined video image data 318 includes a substantially continuous record of the events that happened in the first and second fields of view 320, 322 from the time when the first camera 304 recorded images and continuing through the time when the second camera 306 was powered up and began recording.

With continued reference to FIG. 19, if motion alerts are set to active, an alert may be generated and transmitted to the user's client device 114 along with streaming video at block B392. The streaming video may include the combined image data 318 obtained by both the first, lower-resolution camera 304 and the second, higher-resolution camera 306. At block B394, the combined image data 318 obtained by both the first, lower-resolution camera 304 and the second, higher-resolution camera 306 may be transmitted to a backend server, such as the server 118.

As described above, when the second, higher-resolution camera 306 is powered up, it provides a higher quality image of the second field of view 322 than the image of the first field of view 320 provided by the first, lower-resolution camera 304. Since the first and second fields of view 320, 322 are substantially coincident, at least in some embodiments, the higher quality images recorded by the second camera 306 may be used to enhance the lower quality images recorded by the first camera 304.

Figure 20:
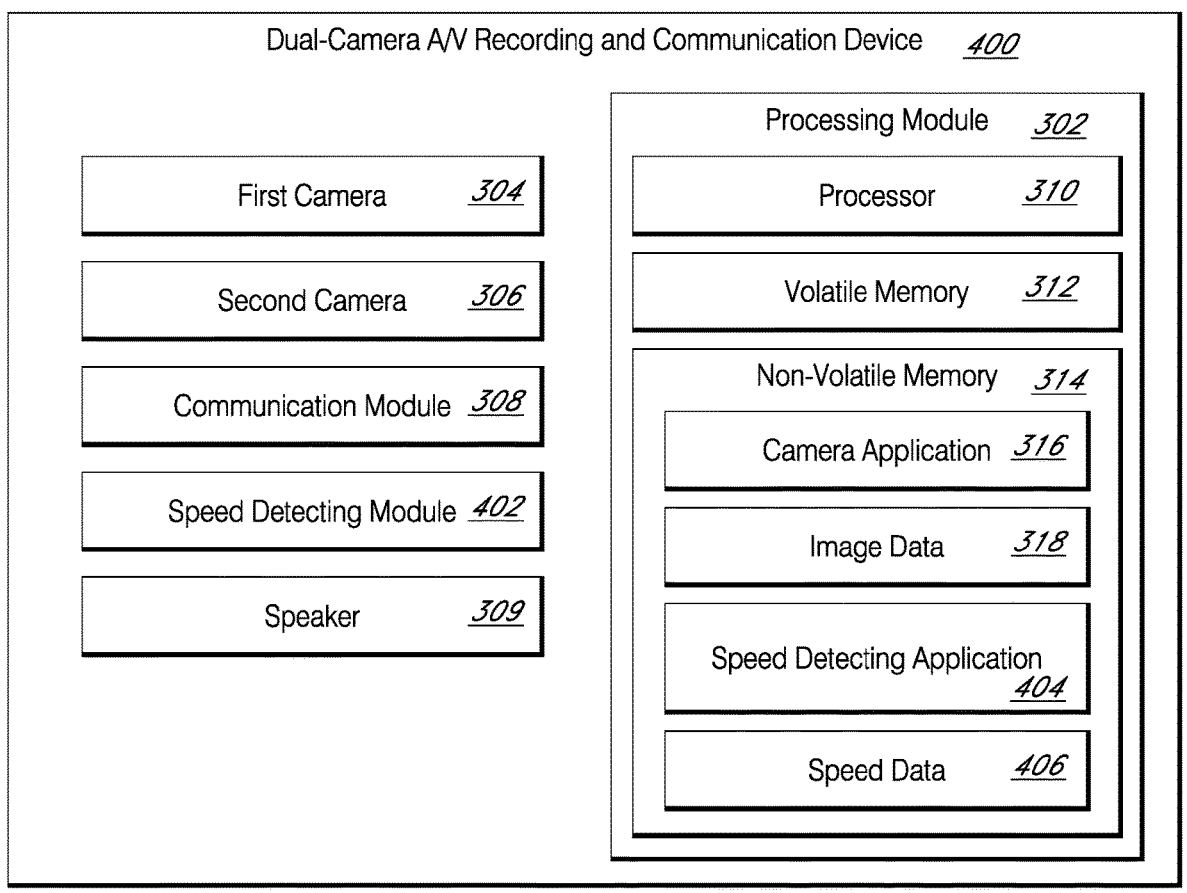
FIG. 20 is a functional block diagram illustrating another embodiment of a dual-camera A/V recording and communication device according to various aspects of the present disclosure.

FIG. 20 is a functional block diagram illustrating another embodiment of a dual-camera A/V recording and communication device 400 according to various aspects of the present disclosure. As shown, the dual-camera A/V recording and communication device 400 may include many of the same components of the dual-camera A/V recording and communication device 300 illustrated in FIG. 15. For example, the dual-camera A/V recording and communication device 400 may include a first camera 304, second camera 306, and a speaker 309 that is operatively connected to a processing module 302. In addition, the processing module 302 may include a processor 310, volatile memory 312 and a non-volatile memory 314. The dual-camera A/V recording and communication device 400 may further include a speed detecting module 402 that is operatively connected to the processing module 302. The non-volatile memory 314 of the processing module 302 may include a speed detecting application 404. The speed detecting application 404 may be used to configure the processor 310 to perform various functions, including (but not limited to) detecting motion of a passing vehicle using the speed detecting module 402, obtaining speed data 406 of the passing vehicle using the speed detecting module 402, and transmitting the obtained speed data 406 to the backend server 118 using the communication module 308, as further discussed below. In some embodiments, the speed detecting module 402 may comprise (but is not limited to) at least one passive infrared (PIR) sensor, a radar device, or a lidar (light detection and ranging) device. In some embodiments, the speed detecting application 404 may also configure the processor 310 to capture image data 318 using the first camera 304 and/or the second camera 306, as described above.

In the illustrated embodiment of FIG. 20, the processing module 302, the speed detecting module 402, and the communication module 308 are represented by separate boxes. The graphical representation depicted in FIG. 20 is, however, merely one example, and is not intended to indicate that any of the processing module 302, the speed detecting module 402, and/or the communication module 308 are necessarily physically separate from one another, although in some embodiments they might be. In other embodiments, however, the structure and/or functionality of any or all of these components may be combined. For example, either or both of the speed detecting module 402 and the communication module 308 may include its own processor, volatile memory, and/or non-volatile memory 314.

Figure 21:
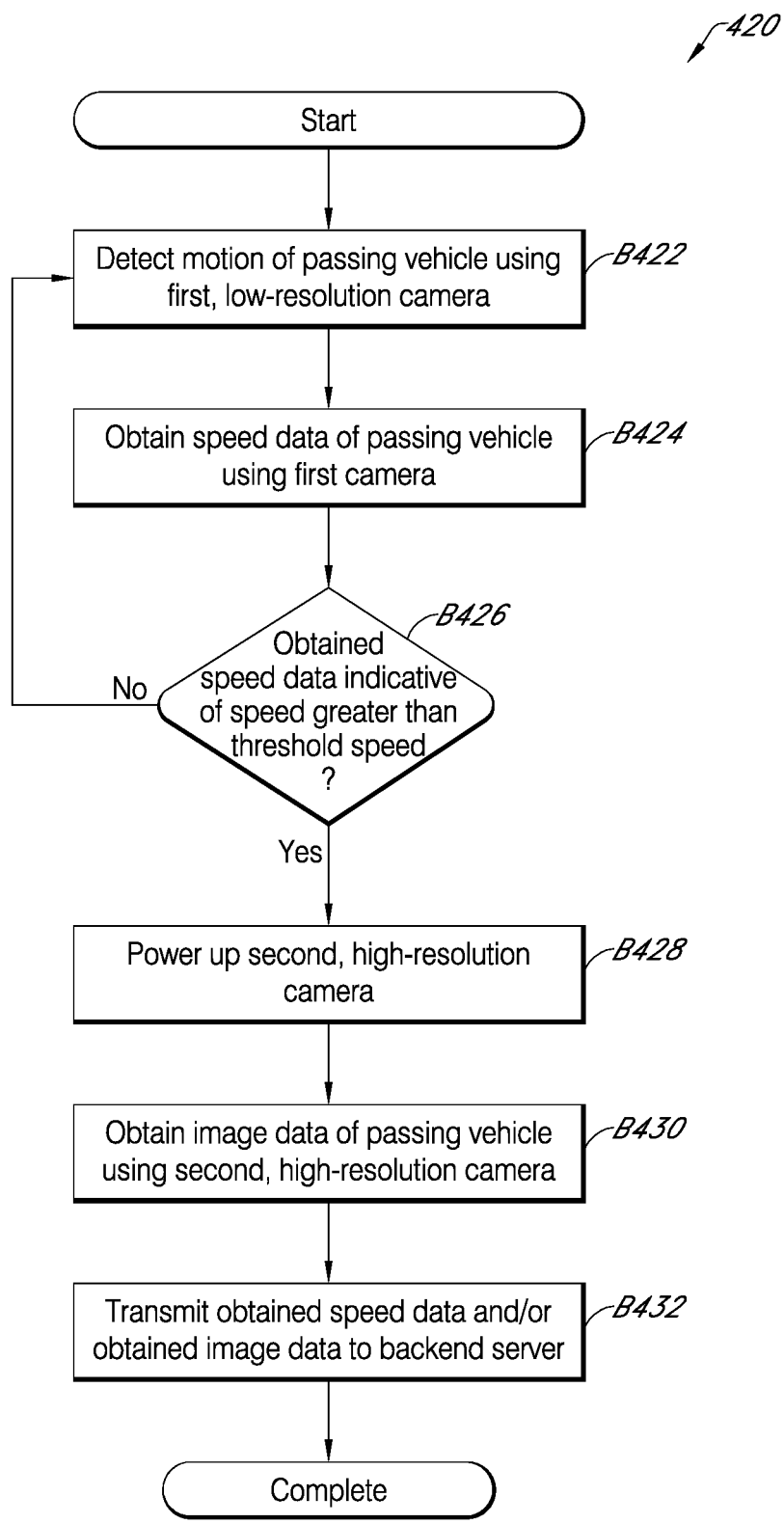
FIG. 21 is a flowchart illustrating another embodiment of a process for a dual-camera A/V recording and communication device according to various aspects of the present disclosure.

FIG. 21 is a flowchart illustrating an embodiment of a process 420 for a dual-camera A/V recording and communication device, such as the dual-camera A/V recording and communication device 400 of FIG. 20, according to various aspects of the present disclosure. The process 420 may include, at block B422, detecting motion of a passing vehicle using the first, lower-resolution camera 304, and obtaining speed data 406 of the passing vehicle using the first camera 304 (block B424). In alternative embodiments, the speed data 406 may be obtained using the speed detecting module 402 (FIG. 20) instead of, or in addition to, the first camera 304. In some embodiments, the type and/or format of the speed data 406 may be determined by the configuration of the speed detecting module 402 used. For example, speed data 406 obtained using a PIR sensor may include (but is not limited to) data related to electromagnetic radiation between microwave and red visible light in the electromagnetic spectrum, and having frequencies between 300 gigahertz and 400 terahertz. Such radiation may include thermal radiation emitted by a passing vehicle. In another example, speed data 406 obtained using a radar device may include (but is not limited to) data related to distance measurements and changes in frequency of returned radar signals caused by the Doppler effect, where the frequency of the returned signal is proportional to the passing vehicle's speed of approach and/or departure. In a further example, speed data 406 obtained using a lidar device may include (but is not limited to) data related to pulsed laser light, stored time that a pulse reflection reached a detector, elapsed time of flight of a pulsed laser light, distance between pulsed laser lights, and/or the difference between pulse distances.

With further reference to FIG. 21, in some embodiments, the second, higher-resolution camera 306 may be configured to power up only when the speed of the passing vehicle is above a threshold speed. In such embodiments, the process 420 may include determining, at block B426, whether the obtained speed data 406 indicates that the speed of the passing vehicle is greater than the threshold speed, such as by comparing the obtained speed data 406 to the threshold speed. If the indicated speed of the passing vehicle is equal to or less than the threshold speed, then the process 420 may return to detecting (block B422) motion of another passing vehicle. However, if the obtained speed data 406 indicates a speed greater than the threshold speed, then the process may include powering up the second, higher-resolution camera 306, at block B428. The second, higher-resolution camera 306 may then obtain image data 318 of the passing vehicle, at block B430. The image data 318 may include, for example, the license plate of the vehicle and/or any other information that may facilitate identifying the vehicle and/or the driver of the vehicle.

In some embodiments, the threshold speed may be set by requesting a speed limit input from a user. In such embodiments, the user may consider the posted speed limit on the roadway that the passing vehicle is travelling and/or an amount of speed that the user may consider as inappropriate for the roadway in consideration of the surrounding area and/or neighborhood. In alternative embodiments, the threshold speed may be set by transmitting a request for a speed limit input using the communication module 308 over the network 112 and receiving in response a speed limit based upon the geographic location of the device 400. In such embodiments, the received speed limit may be the posted speed limit on the roadway corresponding to the geographic location of the device 400. In further embodiments, the threshold speed may be set to a level above the received speed limit that a user may consider as inappropriate for the roadway in consideration of the surrounding area and/or neighborhood.

In further reference to FIG. 21, the process 420 may include transmitting, at block B432, the obtained speed data 406 and/or the obtained image data 318 of the passing vehicle over a network (e.g., the network 112) to a backend server, such as the server 118, using the communication module 308. In various embodiments, image data 318 may comprise image sensor data such as (but not limited to) exposure values and data regarding pixel values for a particular size grid. Further, image data 318 may comprise converted image sensor data for standard image file formats such as (but not limited to) JPEG, JPEG 2000, TIFF, BMP, or PNG. In addition, image data 318 may also comprise data related to video, where such data may include (but is not limited to) image sequences, frame rates, and the like. Moreover, image data 318 may include data that is analog, digital, uncompressed, compressed, and/or in vector formats. Image data 318 (and speed data 406) may take on various forms and formats as appropriate to the requirements of a specific application in accordance with the present embodiments.

While not shown in FIG. 21, the process 420 may include transmitting source identifying data to the backend server 118. The source identifying data may enable the backend server 118 to determine which of one or more dual-camera A/V recording and communication devices 400 transmitted the speed data 406 and/or the image data 318 to the backend server 118. The backend server 118 may use the source identifying data to determine one or more social networks (e.g., Nextdoor or Facebook) to which to transmit a warning message about the vehicle associated with the speed data 406 and/or the image data 318. The warning message may include posting the speed data 406 from the device 400, along with image data 318 (e.g., a photograph and/or a video) of the speeding car, to one or more social networks (not shown). The social network post may be seen by others who live in the neighborhood where the photograph and/or video of the speeding car was taken. Those persons may then apply pressure to the speeder, encouraging him or her not to speed through the neighborhood anymore. Further, the social network post may provide a warning to others who live in the neighborhood where the photograph and/or video of the speeding car was taken, encouraging those people who see the social network post to be watchful for the speeding car so that they are not endangered by the speeder in the future.

As described above, the present embodiments advantageously add at least a second camera to an A/V recording and communication device. The two cameras working in tandem enable functionality that might not be possible with only one camera. For example, in some embodiments the second camera may have different performance characteristics from the first camera, such as different resolution and/or different power consumption. The low-power, low-res camera may be powered on at all times, while the high-power, high-res camera may be typically powered off. The low-power, low-res camera may then be used in a process for determining when to power on the high-power, high-res camera. This arrangement can have particular benefit in a battery-powered A/V recording and communication device, where conserving battery power is desirable to prolong the usable life of the device between battery recharges. In some embodiments, video footage recorded by the low-power, low-res camera can be added to the stream from the high-power, high-res camera to create a pre-roll. Also in some embodiments, the two cameras may be arranged so that their fields of view are coincident (or at least overlapping). The low-power, low-res camera may record video footage before the high-power, high-res camera is powered up, and after the high-power, high-res camera powers up the video footage recorded by the high-power, high-res camera can be used instead of the video footage recorded by the low-power, low-res camera (e.g., the high-power, high-res camera, upon power up, takes over for the low-power, low-res camera). Further, in some embodiments, the low-power, low-res camera may perform at least one other function in addition to recording video footage, such as determining the speed of a passing vehicle. If the speed of the passing vehicle is above a threshold speed, the high-power, high-res camera can be powered up to capture high-resolution images of the vehicle, such as of the vehicle's license plate.

Figure 22:
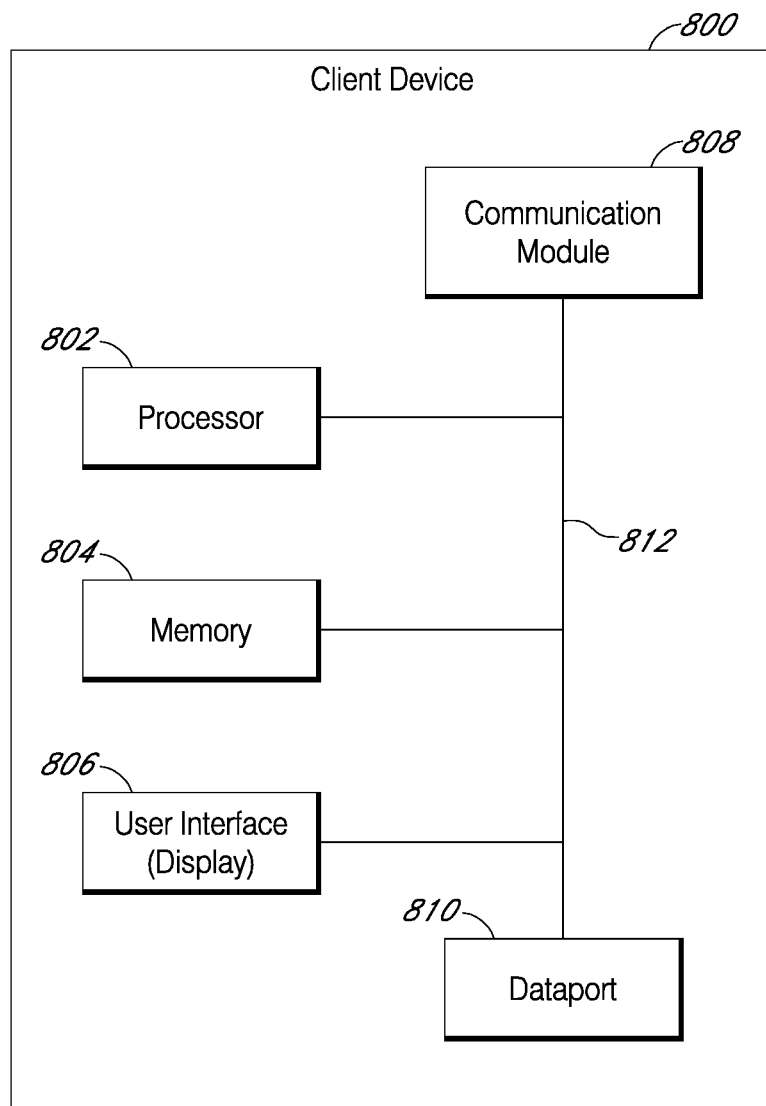
FIG. 22 is a functional block diagram of a client device on which the present embodiments may be implemented according to various aspects of the present disclosure.

FIG. 22 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 22, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 23:
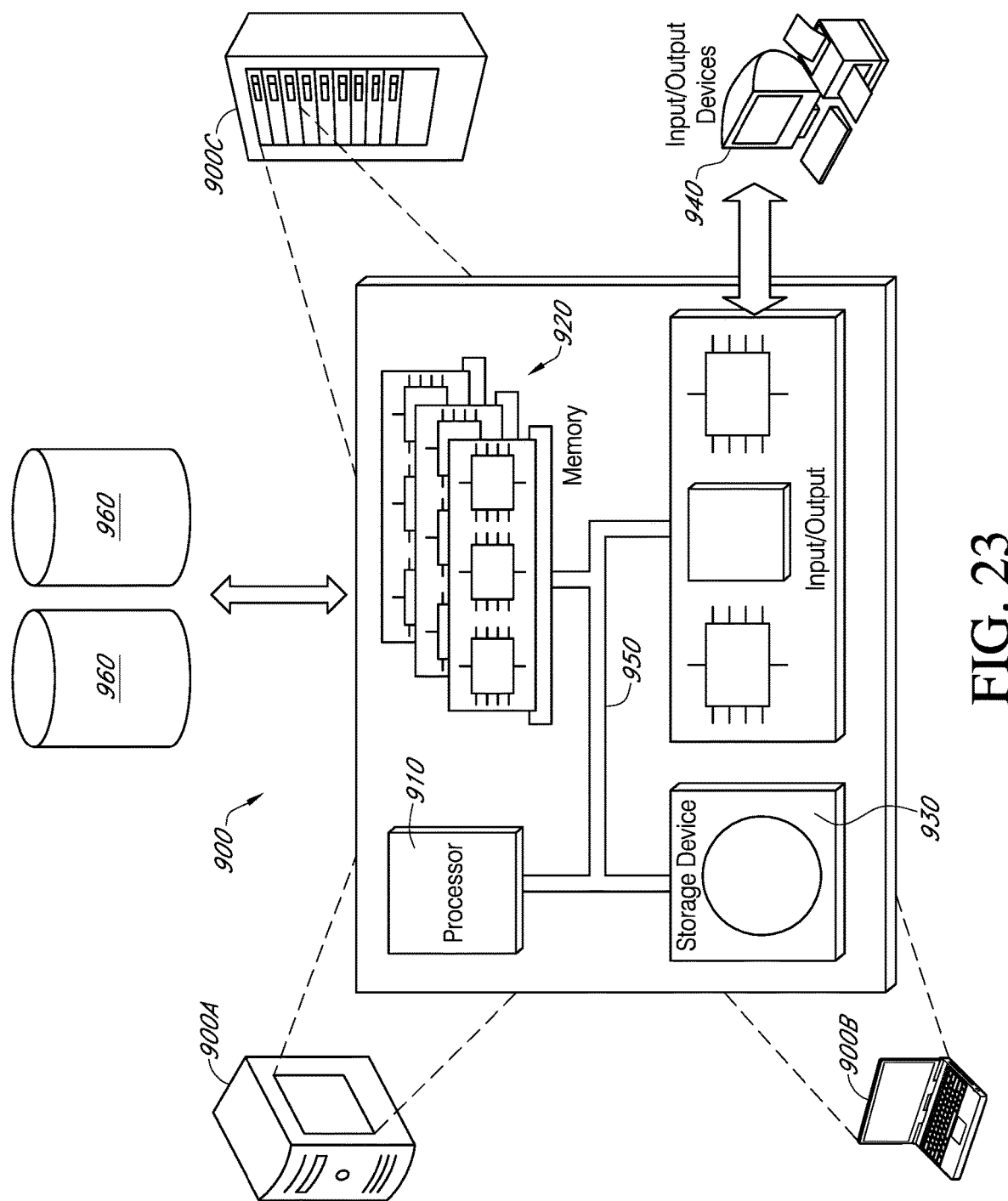
FIG. 23 is a functional block diagram of a general-purpose computing system on which the present embodiments may be implemented according to various aspects of present disclosure.

FIG. 23 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video recording and communication device (A/V device), comprising:
    a first camera having a first resolution;
    a second camera having a second resolution, wherein the second resolution is higher than the first resolution;
    a communication module;
    a processor operatively connected to the first camera, the second camera, and the communication module; and
    a memory storing a camera application comprising instructions that, when executed by the processor, cause the A/V device to:
        maintain the first camera in a powered-on state;
        record first video image data using the first camera;
        maintain the second camera in a low-power or powered-off state;
        power up the second camera based on an output signal from the first camera;
        record second video image data using the second camera;
        prepend at least a portion of the first video image data, captured before the second camera is powered up, to the second video image data to form combined video image data; and
        transmit the combined video image data to a network device.

2. The A/V device of claim 1, wherein the camera application comprises further instructions, that when executed by the processor, further cause the A/V device to store the first video image data recorded using the first camera in the memory.

3. The A/V device of claim 1, wherein the memory comprises a rolling buffer.

4. The A/V device of claim 1, wherein the camera application comprises further instructions, that when executed by the processor, further cause the A/V device to power up the second camera when the output signal from the first camera indicates that motion has been detected in a field of view of the first camera.

5. The A/V device of claim 1, the network device being a client device.

6. The A/V device of claim 1, the network device being a server.

7. The A/V device of claim 1, wherein the camera application comprises further instructions, that when executed by the processor, further cause the A/V device to generate the output signal in response to detection of a person in a field of view of the first camera.

8. The A/V device of claim 1, wherein a field of view of the first camera is at least partially coincident with a field of view of the second camera.

9. The A/V device of claim 1, wherein the A/V device comprises a doorbell having a front button.

10. The A/V device of claim 7, wherein the camera application comprises further instructions, that when executed by the processor, further cause the A/V device to differentiate motion caused by a person from motion caused by other objects by comparing a set of motion characteristics of a moving object with a dataset.

11. The A/V device of claim 10, wherein the camera application comprises further instructions, that when executed by the processor, further cause the A/V device to detect an object region in the first video image data recorded using the first camera.

12. The A/V device of claim 11, wherein the camera application comprises further instructions, that when executed by the processor, further cause the A/V device to extract at least one feature from the object region.

13. The A/V device of claim 12, wherein the camera application comprises further instructions, that when executed by the processor, further cause the A/V device to compare the at least one feature with trained features in the dataset.

14. An audio/video recording and communication device (A/V device), comprising:
- a first camera having a first resolution;
- a second camera having a second resolution, wherein the second resolution is higher than the first resolution;
- a processor operatively connected to the first camera, the second camera, and the communication module; and
- memory storing computer readable instructions that, when executed by the processor, cause the A/V device to:
  - record first image data using the first camera;
  - detect motion using the first image data;
  - in response to detection of the motion:
    - power up the second camera and record second image data using the second camera; and
    - transition the first camera from a first power state to a second power state, the second power state consuming lower power than the first power state; and
  - after recording the second image data using the second camera:
    - power down the second camera, and
    - transition the first camera from the second power state to the first power state.

15. The A/V device of claim 14, the instructions that detect the motion in the first image data comprising instructions that, when executed by the processor, cause the A/V device to compare successive frames recorded by the first camera.

16. The A/V device of claim 14, the memory storing further computer readable instructions that, when executed by the processor, further cause the A/V device to detect a person in the first image data; wherein the instructions to power up the second camera are only executed when the person is detected.

17. The A/V device of claim 14, a field of view of the first camera being at least partially overlapping with a field of view of the second camera.

18. The A/V device of claim 14, the memory storing further computer readable instructions that, when executed by the processor, further cause the A/V device to prepend the first image data to the second image data to form combined image data, and store the combined image data.

19. The A/V device of claim 18, the memory storing further computer readable instructions that, when executed by the processor, further cause the A/V device to transmit the combined image data to a network device.

20. The A/V device of claim 19, the network device being a server.

* * * * *